(12) United States Patent
Mukai et al.

(10) Patent No.: US 11,484,962 B2
(45) Date of Patent: Nov. 1, 2022

(54) WELDING TORCH

(71) Applicant: Kobe Steel, Ltd., Kobe (JP)

(72) Inventors: Naoki Mukai, Fujisawa (JP); Reiichi Suzuki, Fujisawa (JP); Tokuji Maruyama, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 512 days.

(21) Appl. No.: 16/078,163

(22) PCT Filed: Feb. 27, 2017

(86) PCT No.: PCT/JP2017/007420
§ 371 (c)(1),
(2) Date: Aug. 21, 2018

(87) PCT Pub. No.: WO2017/150429
PCT Pub. Date: Sep. 8, 2017

(65) Prior Publication Data
US 2019/0047072 A1 Feb. 14, 2019

(30) Foreign Application Priority Data

Mar. 4, 2016 (JP) .............................. JP2016-042027

(51) Int. Cl.
*B23K 9/29* (2006.01)
*B23K 9/26* (2006.01)

(52) U.S. Cl.
CPC ................ *B23K 9/295* (2013.01); *B23K 9/26* (2013.01); *B23K 9/29* (2013.01)

(58) Field of Classification Search
CPC . B23K 9/26; B23K 9/295; B23K 9/29; B23K 9/12; B23K 9/12; B23K 9/121; B23K 9/122; B23K 9/123; B23K 9/124; B23K 9/125; B23K 9/126

(Continued)

(56) References Cited

U.S. PATENT DOCUMENTS 6,380,515 B1 * 4/2002 Knoll .................... B23K 9/325
219/137.41
6,392,184 B1 5/2002 Yokota et al.
(Continued)

FOREIGN PATENT DOCUMENTS

DE 82 11 393 U1 11/1982
JP 57-11681 U 1/1982
(Continued)

OTHER PUBLICATIONS

Written by Bender Shipbuilding & repair, Jeffboat, General Dynamics, Bath Iron Works, Northrop Grumman Ship system, Alabama Specialty Product, Edison Welding Institute, Title: Final Report "No stick nozzles", Date Nov. 3, 2003, National Shipbuilding Research Program, p. 22 line 7-10 (Year: 2003).*

(Continued)

*Primary Examiner* — Tu B Hoang
*Assistant Examiner* — Yeong Juen Thong
(74) *Attorney, Agent, or Firm* — Oblon, McClelland, Maier & Neustadt, L.L.P.

(57) ABSTRACT

A welding torch for arc welding in a shielding gas atmosphere, includes: a contact tip for feeding a welding wire; a suction nozzle surrounding the welding wire, and sucking a gas from a space between the suction nozzle and the welding wire; and a shielding gas supply nozzle provided on the outer periphery of the suction nozzle, and supplying the shielding gas toward a welded portion from a space between the shielding gas supply nozzle and the suction nozzle. The welding torch satisfies "$7 \leq Ltk \leq 17$ and $0 \leq Lts \leq 18$", where Lts [mm] is a distance between the tip of the contact tip and the tip of the shielding gas supply nozzle, and Ltk [mm] is a distance between the tip of the contact tip and the tip of the suction nozzle.

13 Claims, 11 Drawing Sheets

(58) Field of Classification Search
USPC ...... 219/136, 74, 75, 121.36, 121.48, 121.5, 219/121.51
See application file for complete search history.

(56) References Cited

U.S. PATENT DOCUMENTS

| | | | |
|---|---|---|---|
| 2009/0230120 A1* | 9/2009 | Yang | B23K 37/0217 |
| | | | 219/60 A |
| 2010/0276396 A1* | 11/2010 | Cooper | B23K 9/325 |
| | | | 219/74 |
| 2012/0248069 A1* | 10/2012 | Fisher | B23K 9/1043 |
| | | | 219/74 |
| 2012/0285932 A1 | 11/2012 | Yuan et al. | |
| 2013/0313241 A1* | 11/2013 | Zander | B23K 9/164 |
| | | | 219/137.62 |

FOREIGN PATENT DOCUMENTS

| | | | |
|---|---|---|---|
| JP | 62-13273 A | | 1/1987 |
| JP | H09314339 A | * | 12/1997 |
| JP | 2000-312972 A | | 11/2000 |
| JP | 2002-506736 A | | 3/2002 |
| JP | 2004-160506 A | | 6/2004 |
| JP | 2015-37805 A | | 2/2015 |
| KR | 10-2009-0040251 A | | 4/2009 |
| KR | 20-2012-0008018 U | | 11/2012 |
| WO | WO 2007/106925 A1 | | 9/2007 |

OTHER PUBLICATIONS

International Preliminary Report on Patentability and Written Opinion dated Sep. 13, 2018 in PCT/JP2017/007420 (with English translation).
International Search Report dated Apr. 4, 2017, in PCT/JP2017/007420 filed Feb. 27, 2017.
Extended European Search Report dated Nov. 11, 2019 in European Patent Application No. 17759895.0, 7 pages.

* cited by examiner

WELDING TORCH

CROSS-REFERENCE TO RELATED APPLICATIONS

This is a national phase application in the United States of International Patent Application No. PCT/JP2017/007420 with an international filing date of Feb. 27, 2017, which claims priority of Japanese Patent Application No. 2016-042027 filed on Mar. 4, 2016 the contents of which are incorporated herein by reference.

TECHNICAL FIELD

The present invention relates to a welding torch.

BACKGROUND ART

In the welding industry, hydrogen embrittlement and hydrogen cracking of a weld metal by diffusible hydrogen (hydrogen atom H) in a weld metal poses a problem. Diffusible hydrogen in a weld metal gathers at grain boundaries and/or microspaces in a steel structure to form hydrogen molecules ($H_2$), so that the volume is increased. The swelling pressure thereof causes cracking in the weld metal, leading to breakage of a construction. For such hydrogen cracking, susceptibility to hydrogen cracking becomes higher as the strength of steel increases, and in recent years, high-tensile-strength steel has tended to be used in welding.

FIG. 11 is a diagram for illustrating a process in which diffusible hydrogen is absorbed by a weld metal. In FIG. 11, a flux cored wire which is a welding wire containing a flux is used as a welding wire. FIG. 12 is a view showing a cross-section of the flux cored wire.

A welding wire 201, which is a flux cored wire, includes a steel hoop 202 forming the outer periphery, and a central portion 203. In the flux cored wire, the central portion 203 contains a metal powder of a metal or alloy, and a flux. The welding wire 201 is fed through a contact tip 208, and simultaneously, a welding current passes from the contact tip 208 to the welding wire 201, so that the welding wire 201 is melted by an arc 209 at the tip of the welding wire 201 to form a weld metal 210. Here, a welding current passes through a wire protrusion portion 211 of the welding wire 201, which is protruded from the contact tip 208, and therefore resistance heat generation occurs, so that the temperature is elevated. For example, the elevated temperature reaches 100° C. at a point about 5 mm away from the tip of the contact tip 208, and may be elevated to about 600° C. in the vicinity of a wire tip 20 mm away from the tip of the contact tip 208.

When the temperature of the wire protrusion portion 211 is elevated to a temperature above 100° C., first a hydrogen source 205 on the wire surface is vaporized, and discharged from the welding wire 201. Subsequently, the central portion 203 is heated by conduction of heat from the heated steel hoop 202, the hydrogen source 205 in the flux and in the metal powder is also vaporized, and discharged to the outside of the welding wire 201 through a seam 204 as a joint. A part of the hydrogen source 205 discharged from the welding wire 201 flows in a direction indicated by an arrow 213 in accordance with an arc plasma stream, and a flow of a shielding gas supplied to a welded portion from a nozzle 206 (in a direction indicated by an arrow 207) in the case of gas shielding arc welding, and is guided to the arc 209. Since the arc 209 has a high temperature of several thousand degrees, the hydrogen source 205, e.g. $H_2O$, is dissociated into diffusible hydrogen 212, and absorbed by solution droplets in an arc column and the weld metal 210 to enter the weld metal 210.

In this way, the hydrogen source present on the wire surface and/or the hydrogen source contained in a flux and metal powder used for the welding wire are vaporized in the wire protrusion portion heated to a high temperature. The vaporized hydrogen source is carried to the inside of the arc column and the vicinity thereof by the arc plasma stream, and the flow of the shielding gas supplied in the case of gas shielding arc welding. The carried hydrogen source is dissociated into hydrogen atoms (i.e. diffusible hydrogen), and absorbed into the weld metal.

As measures against hydrogen embrittlement and hydrogen cracking caused by diffusible hydrogen, preheating (heating of a weld steel material before welding) and/or post-heating (heating of a welded portion after welding) may be performed for promoting discharge of diffusible hydrogen to the outside from a weld metal. In addition, when a flux cored wire is used in welding, a method is also used in which fluorides such as $CaF_2$ and/or $Na_3AlF_6$ are added to a flux to reduce diffusible hydrogen. Further, a method has also been proposed in which a very small amount of $CF_4$ is mixed with a shielding gas supplied in gas shielding arc welding.

Problems to be Solved by the Invention

Hydrogen sources in a welding wire include oil and moisture deposited on a wire surface, and moisture and organic substances deposited on a flux and metal powder included in a flux cored wire and/or a metal cored wire. Generally, the amount of the hydrogen source deposited on a flux and/or metal powder is larger than the amount of the hydrogen source deposited on a welding wire surface. Thus, for reduction of the hydrogen source that is deposited on a flux and metal powder, a method may be employed in which before production of a welding wire, the flux and metal particles are heated at a high temperature to remove the hydrogen source. In addition, prevention of absorption of moisture in a production process is necessary, but requires an enormous cost. Further, even after commercialization, moisture is adsorbed from air during storage and operation at a high-humidity welding site, and thus there are various obstacles to reduction of the hydrogen source.

In addition, preheating and/or post-heating that is performed as measures against hydrogen embrittlement and hydrogen cracking involves heating at 150 to 250° C., and thus requires an enormous energy cost and labor. In addition, there is the problem that high-temperature operation is required, and thus a heavy burden is put on welding operators. When a fluoride is added to a flux, an increase in the amount of the additive deteriorates the stability of an arc, and therefore it may be unable to sufficiently reduce diffusible hydrogen. Further, the method in which $CF_4$ is mixed with a shielding gas has a safety problem and a problem of deterioration of the stability of an arc, and there may be an obstacle to wide use of the method.

The torch shown in JP 2002-506736 A sucks fumes from an opening portion that surrounds the periphery of a welding wire protruded from a contact tip, and faces a wire tip portion. It is thought that in this torch, a hydrogen source desorbed from the welding wire during welding is sucked together with fumes, and discharged to the outside of a welded portion to reduce the amount of diffusible hydrogen in a weld metal, although this is not described in JP 2002-506736 A. However, JP 2002-506736 A shows only a rough configuration of the torch, and does not describe a detailed configuration including the sizes and relative positions of nozzles and tips. Considering the practicability and effectiveness of the system for reducing the amount of diffusible hydrogen, the torch may have an optimal configuration from the viewpoints of hydrogen suction performance, prevention of pore defects of a weld metal, and protection of torch components, but JP 2002-506736 A does not suggest such an optimal configuration. Since pursuit of hydrogen suction performance leads to a structure that cannot endure long-time use, a proper design is required. In addition, depending on the structure of a suction nozzle, the flow condition of a shielding gas is deteriorated, and therefore shielding property is deteriorated, so that air is entrained, leading to generation of pore defects. The present disclosure has been made in view of the above-described circumstances, and an object of the present disclosure is to provide a welding torch capable of improving welding quality by exhibiting high hydrogen suction performance while protecting the welding torch.

Means for Solving the Problems

An example of the present invention provides a welding torch which performs arc welding in a shielding gas atmosphere, the welding torch comprising: a contact tip that supports a welding wire which is supplied with a welding current while the welding wire can be fed toward a tip portion; a suction nozzle that surrounds a periphery of the welding wire protruded from a tip portion of the contact tip, and sucks a gas from a space formed between the suction nozzle and the welding wire; and a shielding gas supply nozzle that is provided on an outer periphery of the suction nozzle, and supplies the shielding gas toward a welded portion at a tip of the welding wire from a space formed between the shielding gas supply nozzle and the suction nozzle, wherein where Lts [mm] is a distance along a welding wire longitudinal direction between a tip of the contact tip and a tip of the shielding gas supply nozzle, and Ltk [mm] is a distance along the welding wire longitudinal direction between the tip of the contact tip and a tip of the suction nozzle, the welding torch satisfies the relationship of the formula (1).

$$7 \leq Ltk \leq 17,$$
$$0 \leq Lts \leq 18 \quad (1)$$

According to the present disclosure, welding quality can be improved by exhibiting high hydrogen suction performance to prevent generation of pore defects etc. of a weld metal while protecting a welding torch.

DESCRIPTION OF EMBODIMENTS

Hereinafter, an embodiment of the present invention will be described with reference to the drawings.

<Configuration of Welding System>

A welding apparatus 10 according to a configuration example is an apparatus that performs welding by consumable electrode type gas shielding arc welding. The consumable electrode is an electrode that is melted by arc heat in arc welding. In addition, the gas shielding arc welding is a welding method in which welding is performed with a welded portion shielded from outside air by an injected shielding gas. The welding apparatus 10 performs welding while sucking a shielding gas containing a hydrogen source 11 in the vicinity of the wire protrusion portion in the shielding gas injected to the welded portion.

Figure 1:
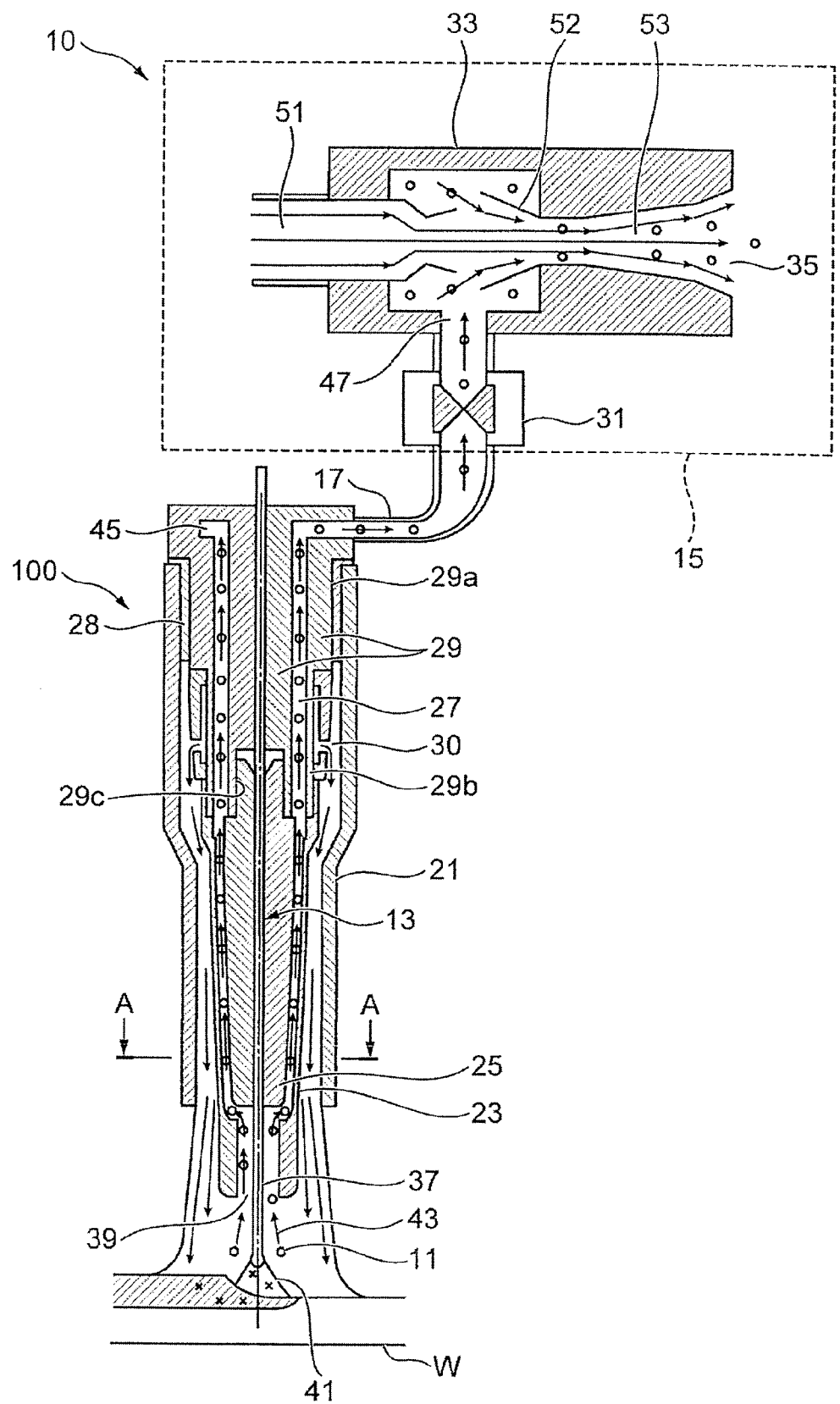
FIG. 1 is a diagram showing one example of a schematic configuration of a welding apparatus according to an embodiment.

FIG. 1 is a diagram showing one example of a schematic configuration of the welding apparatus 10 according to an embodiment. As shown in FIG. 1, the welding apparatus 10 of this configuration example includes a welding torch 100 that welds a workpiece W using a welding wire 13; and a suction apparatus 15 that sucks a shielding gas. In addition, the welding apparatus 10 includes a suction shielding gas channel 17 connecting the welding torch 100 and the suction apparatus 15.

The welding torch 100 welds the workpiece W by feeding a welding wire 13 with a welding current supplied from a welding power source (not shown). As the welding wire 13, for example, a flux cored wire having a metal powder and a flux at a central portion, a metal cored wire having mainly a metal powder at a center portion, or a solid wire composed of an alloy such as steel is used.

The welding torch 100 includes a shielding gas supply nozzle 21, a suction nozzle 23, a contact tip 25, a suction channel 27, and a tip body 29. Further, an insulating component 28 for insulating the shielding gas supply nozzle 21 and the tip body 29 is provided between the shielding gas supply nozzle 21 and the tip body 29.

The suction apparatus 15 includes a flow rate control valve 31 and an ejector 33, and sucks a shielding gas from the suction nozzle 23 of the welding torch 100. The shielding gas is supplied to the shielding gas supply nozzle 21 from an external shielding gas supply apparatus (not shown) such as a shielding gas cylinder. It suffices that the suction apparatus 15 has a suction capacity of, for example, about 25 L/min. It is possible to employ a suction apparatus which is small in size and available at a low cost rather than one requiring a large amount of energy.

The suction shielding gas channel 17 connects the suction channel 27 of the welding torch 100 to the suction apparatus 15 to form a channel through which the sucked shielding gas flows. The suction shielding gas channel 17 is formed of, for example, a rubber tube.

Next, a configuration of the welding torch 100 will be described.

The shielding gas supply nozzle 21 has a tubular shape, and is fitted and fixed to the tubularly formed tip body 29 from the lower side in FIG. 1. The insulating resin component 28 is provided on an outer peripheral surface 29a of the tip body 29 on the upper side in the drawing, so that the shielding gas supply nozzle 21 and the tip body 29 are insulated from each other. The shielding gas supply nozzle 21 supplies a shielding gas to the welded portion. In addition, since the shielding gas supply nozzle 21 is tubularly formed, the shielding gas is supplied in such a manner that the welded portion is surrounded and shielded from outside air.

The suction nozzle 23 is disposed in the shielding gas supply nozzle 21, and has a tubular shape. The suction nozzle 23 is fitted and fixed to the outer peripheral surface 29b of the tubular portion of the tip body 29, which is protruded to the lower side in FIG. 1. An orifice 30 serving as a throttle for making uniform the shielding gas sent from a shielding gas supply apparatus (not shown) is disposed between the shielding gas supply nozzle 21 and the outer peripheral surface 29b of the tip body 29 connected to the suction nozzle 23.

Figure 2:
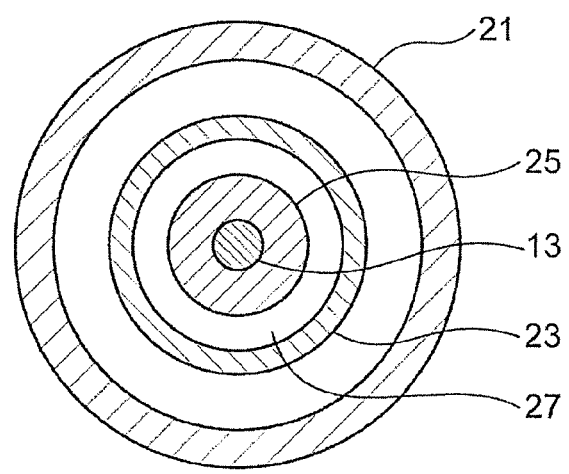
FIG. 2 is a sectional view taken along line A-A in FIG. 1.

The suction nozzle 23 is structured to surround the periphery of a wire protrusion portion 37 of the welding wire 13, which is protruded from the contact tip 25, and the suction nozzle 23 has an opening portion 39 extending toward the tip portion of the welding wire 13. FIG. 2 is a sectional view taken along line A-A in FIG. 1 in the welding apparatus 10. As shown in FIG. 2, a welding wire 13 is provided at the center of the contact tip 25, and the suction nozzle 23 exists so as to surround the periphery of the contact tip 25. In addition, the shielding gas supply nozzle 21 is provided so as to surround the periphery of the suction nozzle 23.

Here, the suction nozzle 23 is opened toward the tip of the welding wire 13, i.e. along a direction in which an arc 41 is generated. The suction nozzle is configured to suck a shielding gas including the hydrogen source 11 discharged in the vicinity of the wire tip portion. When sucked by the suction nozzle 23, the shielding gas including the hydrogen source 11 is discharged to the outside of the welded portion by flowing in a direction of arrow 43, which is a direction in which the shielding gas goes toward the outside of the welded portion.

For sucking the hydrogen source 11 discharged in the vicinity of the wire tip portion, the suction nozzle 23 may be configured to have such a large length that even the wire tip portion is surrounded, but there is the possibility that the suction nozzle 23 is melted by arc heat. Thus, the suction nozzle 23 is configured to be opened toward the wire tip portion while having a length determined with consideration given to influences of arc heat. As the suction nozzle 23, for example, a copper alloy excellent in heat conduction, or a ceramic excellent in heat resistance is used. Further, one subjected to chromium plating or the like for preventing deposition of spatters may be used.

The contact tip 25 is disposed on an inner diameter portion of the suction nozzle 23, and has a tubular shape. The contact tip 25 is fixed by fitting a contact tip upper portion to an inner diameter portion 29c of the tip body 29 on the lower side in FIG. 1. The contact tip 25 guides the welding wire 13, and supplies a welding current to the welding wire 13. In the contact tip 25, a wire feeding channel having a diameter that allows the wire feeding channel to come into contact with the welding wire 13 is formed, and power is supplied to the welding wire 13. In addition, the contact tip 25 is detachably attached to the tip body 29, and is replaced when worn due to long-time use.

The suction channel 27 guides the shielding gas sucked by the suction nozzle 23 to the suction apparatus 15. This suction channel 27 includes passages formed by boring four holes with a diameter of, for example, about 1.5 mm in the tip body 29 using a drill, and the passages formed by the four holes are joined in a circumferential joining groove 45, and then connected to the suction apparatus 15 through the suction shielding gas channel 17. However, the suction channel 27 does not necessarily have such a configuration, and may have any configuration as long as it forms a channel that guides the shielding gas and/or hydrogen source 11 from the suction nozzle 23 to the suction apparatus 15.

The tip body 29 is a main body portion of the welding torch 100. The tip body 29 has a tubular shape, and supports the shielding gas supply nozzle 21, the suction nozzle 23, and the contact tip 25 which are connected through the insulating resin component 28.

Next, a configuration of the suction apparatus 15 will be described.

The flow rate control valve 31 is formed by, for example, a needle valve, includes an actuator such as a motor (not shown), and controls a suction flow rate. The flow rate control valve 31 is provided between a suction port 47 of the ejector 33 as described later and the suction shielding gas channel 17.

The ejector 33 is in the form of a T-shaped tube, and has a function of a general ejector. That is, when a drive gas such as compressed air flows in a horizontal direction, the flow velocity is increased at a portion having a small diameter in the tube, and a tube corresponding to the vertical line of the T shape serves as a suction port, so that a shielding gas is sucked through the suction nozzle 23. The ejector 33 includes a drive nozzle 52, a gas supply port 51, a suction port 47, and an exhaust port 35.

In the ejector 33, a drive gas such as compressed air is supplied to the gas supply port 51. In addition, the drive gas guided from the gas supply port 51 to the drive nozzle 52 is ejected toward the exhaust port 35. Here, a suction force acts on the suction port 47, and the shielding gas including the hydrogen source 11 is guided to the suction port 47 from the suction nozzle 23 connected through the suction shielding gas channel 17 and the suction channel 27. The sucked shielding gas including the hydrogen source 11 in the suction port 47 is sent to the exhaust port 35.

Thus, in the welding apparatus 10 according to this configuration example, the suction apparatus 15 performs suction on the periphery of the wire protrusion portion 37 and in the vicinity of the tip portion of the welding wire 13 by the suction nozzle 23. The shielding gas including the hydrogen source 11 discharged from the heated welding wire 13 flows in a direction of arrow 43, which is a direction in which the shielding gas goes toward the outside of the welded portion and is sucked. When suction is not performed using the suction apparatus 15, the hydrogen source 11 is situated just above the arc 41, and therefore most of the hydrogen source 11 is guided to the arc 41, and absorbed into the weld metal. On the other hand, by using the welding apparatus 10 according to this configuration example, a situation in which the hydrogen source 11 flows into the arc 41, and is absorbed into the weld metal as diffusible hydrogen in the arc 41 is suppressed to reduce the amount of diffusible hydrogen in the weld metal. As a result of reducing the amount of diffusible hydrogen in the weld metal, hydrogen embrittlement and hydrogen cracking in the weld metal are prevented.

Generally, the required preheating temperature can be lowered by about 25° C. by decreasing the amount of diffusible hydrogen in a weld metal by 1 mL/100 g. For example, when the amount of diffusible hydrogen is decreased by 4 mL/100 g, the preheating temperature can be lowered by 100° C. in welding requiring a preheating temperature of 125° C., so that the preheating temperature is lowered to 25° C., resulting in elimination of necessity of preheating. In addition, for example, in welding requiring a preheating temperature of 200° C., the preheating temperature is 100° C. or lower. The lowering of the preheating temperature provides economic effects such as saving of preheating energy and/or reduction of labor and time required for preheating. In addition, a harsh work environment for preheating operation at 200° C. is improved.

Further, the welding wire 13 absorbs moisture depending on the storage environment, but whether the welding wire 13 absorbs moisture is not known by visual observation, and therefore thorough management of the storage environment is required. When the welding apparatus 10 according to this configuration example is used, the amount of diffusible hydrogen in the weld metal decreases, and therefore the level of management of the storage environment is reduced, so that even if absorption of moisture occurs due to a human mistake, influences of such a mistake are relaxed.

Figure 3:
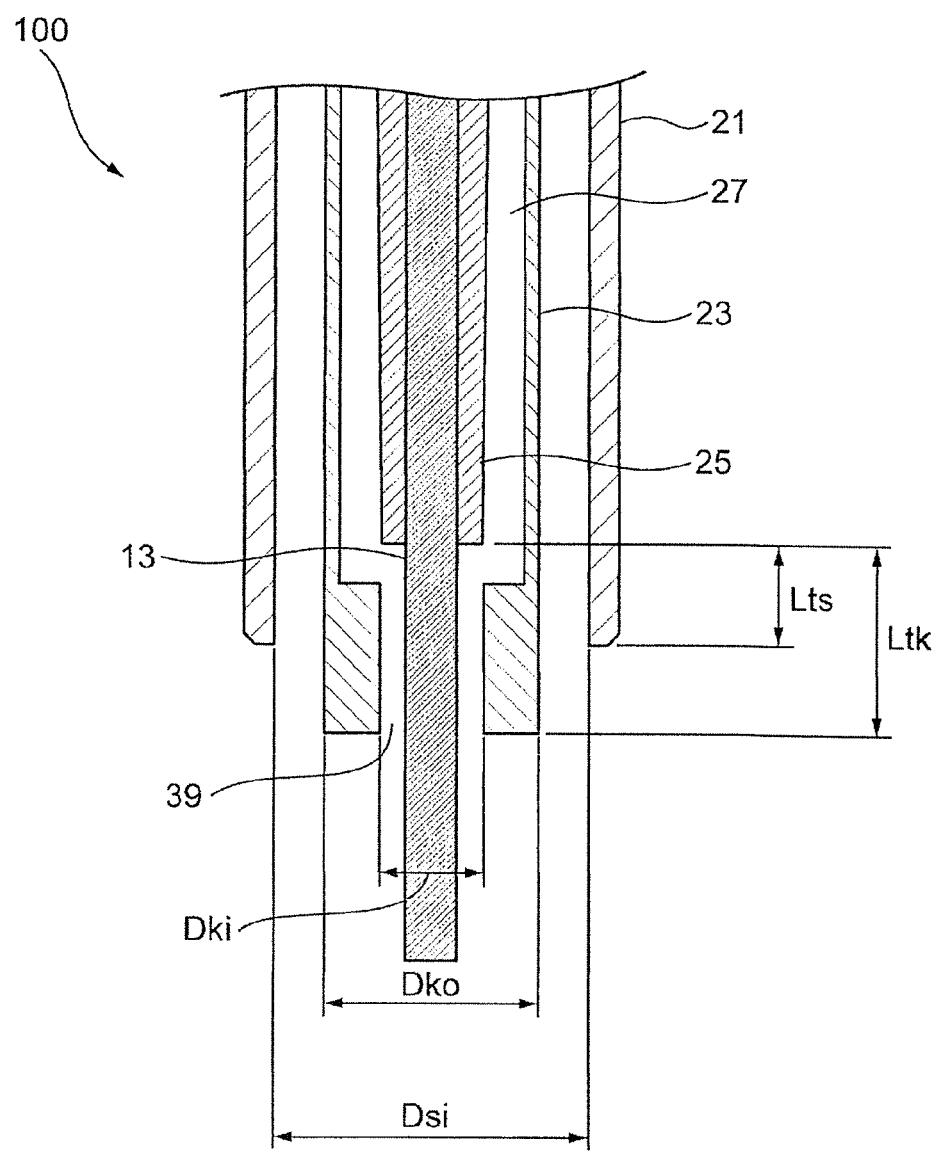
FIG. 3 is an enlarged view of a main part of a tip portion of the welding torch shown in FIG. 1.

FIG. 3 is an enlarged view of a main part of the tip portion of the welding torch shown in FIG. 1.

The welding torch 100 of this configuration example performs arc welding in a shielding gas atmosphere. The welding torch includes: the contact tip 25 that supports a welding wire which is supplied with a welding current while the welding wire can be fed toward a tip portion; the suction nozzle 23 that surrounds a periphery of the welding wire protruded from a tip portion of the contact tip 25, and sucks a gas from a space formed between the suction nozzle 23 and the welding wire; and the shielding gas supply nozzle 21 that is provided on an outer periphery of the suction nozzle 23, and supplies the shielding gas toward a welded portion at a tip of the welding wire from a space formed between the shielding gas supply nozzle 21 and the suction nozzle 23.

Here, the contact tip 25, the shielding gas supply nozzle 21, and the suction nozzle 23 in the welding torch 100 has the following positional relationship.

That is, where Lts [mm] is a distance along a welding wire longitudinal direction between the tip of the contact tip 25 and the tip of the shielding gas supply nozzle 21, and Ltk [mm] is a distance along the welding wire longitudinal direction between the tip of the contact tip 25 and the tip of the suction nozzle 23, the welding torch 100 satisfies the relationship of the formula (1).

$$7 \leq Ltk \leq 17, 0 \leq LTS \leq 18 \quad (1)$$

The distance Ltk is preferably 9 or more, and preferably 15 or less, more preferably 14 or less.

In addition, the distance Lts is preferably 4 or more, and preferably 16 or less, more preferably 15 or less.

In addition, the welding torch 100 satisfies the relationship of the following formula regarding the diameters of the shielding gas supply nozzle 21 and the suction nozzle 23.

That is, where Dsi [mm] is an inner diameter of the shielding gas supply nozzle 21, Dki [mm] is an inner diameter of the suction nozzle 23, and Dko [mm] is an outer diameter of the suction nozzle 23, the welding torch 100 satisfies the relationship of the formula (2).

$$Dsi-Dko \geq 2$$

$$Dko-Dki \geq 1.2$$

$$8 \leq Dsi \leq 40$$

$$1.5 \leq Dki \leq 12 \quad (2)$$

The difference Dsi−Dko between the inner diameter Dsi of the shielding gas supply nozzle 21 and the outer diameter Dko of the suction nozzle 23 is preferably 3 or more. In addition, the difference Dko−Dki is preferably 2 or more.

In addition, the inner diameter Dsi of the shielding gas supply nozzle 21 is preferably 13 or more, and more preferably 35 or less.

In addition, the inner diameter Dki of the suction nozzle 23 is preferably 1.8 or more, and more preferably 8 or less.

However, when a plurality of suction nozzles 23 are mounted, the largest of the distances along the welding wire longitudinal direction between the tip of the contact tip 25 and the tips of the suction nozzles 23 is defined as the distance Ltk.

In addition, the welding torch 100 has an electric resistance of 50Ω or more between the tip body 29 and the tip of the suction nozzle 23. The electric resistance is more preferably 500Ω or more.

In addition, the surface roughness of the inner surface of the suction nozzle in the welding torch 100 satisfies the relationship of following formula.

That is, where Ra [μm] is an arithmetic mean roughness of the inner surface of the suction nozzle, the surface roughness Ra of the nozzle inner peripheral surface in the suction nozzle 23 of the welding torch 100 satisfies the relationship of $0.05 \leq Ra \leq 50$.

The arithmetic mean roughness Ra is preferably 20 or less, more preferably 10 or less. In addition, the arithmetic mean roughness Ra is preferably 0.3 or more, more preferably 1 or more.

In addition, where Qk [L/min] is a suction gas flow rate at the suction nozzle 23, the welding torch 100 satisfies the relationship of the following formula (3).

$$Ltk \geq 10-0.6 \times Qk \quad (3)$$

The distance Ltk is preferably $10-0.4 \times Qk$ or more.

In addition, where Ss [mm$^2$] is a cross-sectional area of a shielding gas outlet at the tip of the shielding gas supply nozzle 21, Qs [L/min] is a shielding gas flow rate, and Vs [m/s] is a flow velocity at the shielding gas outlet, the welding torch 100 satisfies the relationship of the formula (4).

$$Ss=(Dsi^2-Dko^2)\pi/4$$

$$Vs=1000 \times Qs/(60 \times Ss) \leq 7 \quad (4)$$

The flow velocity Vs is preferably 5 or less, more preferably 4 or less.

Figure 4:
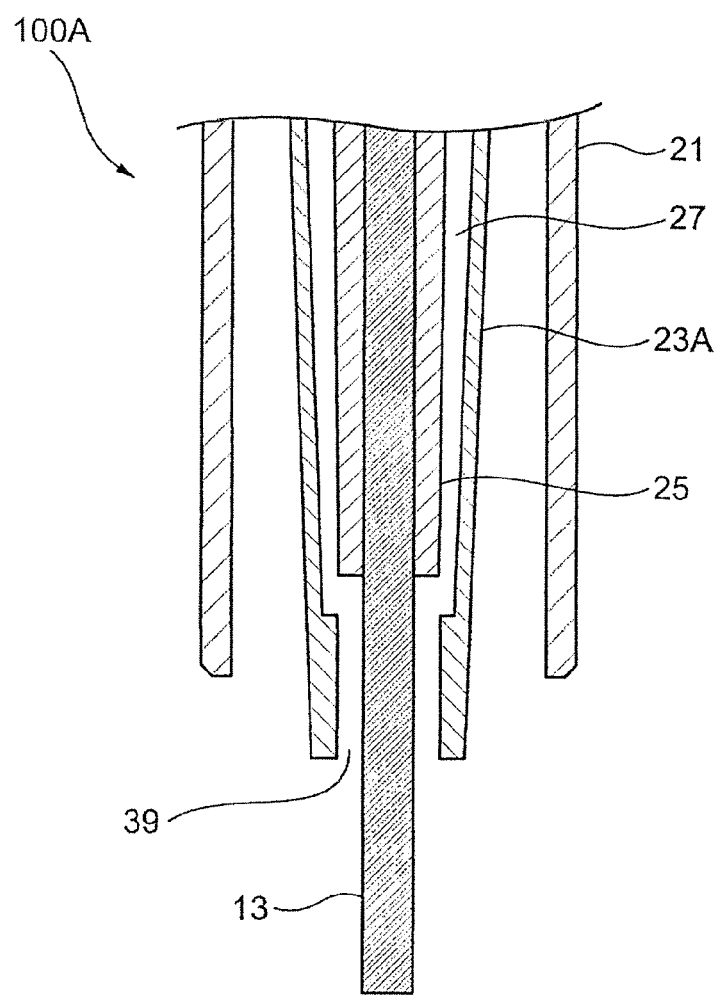
FIG. 4 is an enlarged view of a main part of a welding torch according to a modification in which a suction nozzle has a taper.

FIG. 4 is an enlarged view of a main part of a welding torch according to a modification in which the suction nozzle 23 has a taper. In a welding torch 100A of this modification, a suction nozzle 23A is formed so as to have a taper in which the diameter gradually decreases as going toward the tip. Since the suction nozzle 23A has a taper, the flow velocity at the suction channel 27 can be gradually increased as going toward the tip opening. In addition, in the welding torch 100A, a space formed between the outer periphery of the suction nozzle 23A and the shielding gas supply nozzle 21 can be expanded by forming the suction nozzle 23A with a taper. Accordingly, the flow velocity Vs at the shielding gas outlet can be easily set within a preferred range.

Figure 5:
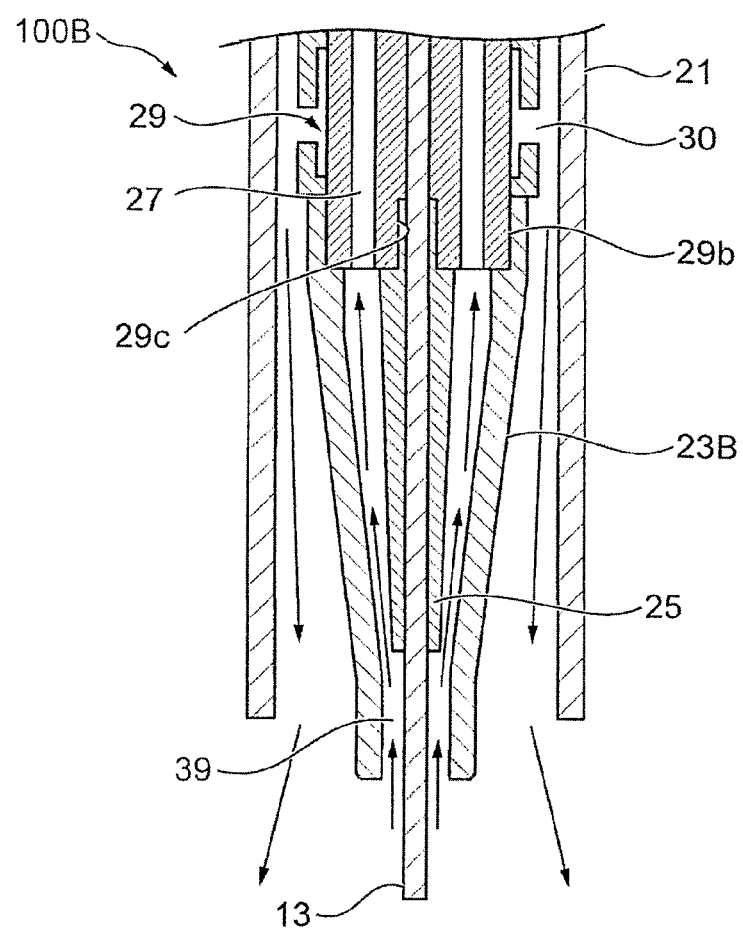
FIG. 5 is an enlarged view of a main part of a welding torch according to a modification in which the shape of the tip portion of the suction nozzle is changed.

FIG. 5 is an enlarged view of a main part of a welding torch according to a modification in which the shape of the tip portion of a suction nozzle 23B is changed.

In a welding torch 100B of this modification, the outer peripheral surface 29b of the tip body 29 supports the suction nozzle 23B, and the inner diameter portion 29c of the tip body 29 supports the contact tip 25.

In the examples shown in FIGS. 3 and 4, the inner surface of the tip portion of each of the suction nozzles 23 and 23A is formed so as to decrease the diameter to the inner periphery side and have a large thickness, but the tip portion may be formed with the same thickness as that of the other portions as in the suction nozzle 23B shown in FIG. 5.

Next, effects of the above-described configuration will be described.

The welding torch 100 sucks a part of the shielding gas for reducing the amount of diffusible hydrogen in the weld metal. Here, matters to be noted include hydrogen suction performance, prevention of generation of pore defects in the weld metal, and protection of torch components.

<Hydrogen Suction Performance>

(Securement of Hydrogen Suction Performance)

During welding, the welding wire 13 delivered from the contact tip 25 is fed with a welding current from this moment, and therefore undergoes generation of Joule heat, so that the temperature is elevated. The temperature is elevated as the distance between the welding wire 13 and the contact tip 25 increases. In addition, the discharge rate of the hydrogen source 11 discharged from the welding wire 13 increases as the amount of applied energy increases. Thus, when consideration is given to hydrogen suction performance, it is preferable that the suction nozzle 23 (the same applies to reference numerals 23A and 23B) covers the welding wire 13 up to a position at which the wire temperature is further elevated. That is, in the suction nozzle 23, the distance Ltk along the welding wire longitudinal direction between the tip of the contact tip 25 and the tip of the suction nozzle 23 is preferably long.

(Securement of Hydrogen Suction Performance)

When the suction flow rate Qk is large, the hydrogen source 11 discharged at a position distant from the suction nozzle 23 by a flow at the tip of the nozzle can also be sucked. In this connection, the inventors have derived a relational formula between the preferred suction flow rate and the suction nozzle position (see the foregoing formula (3)) through an experiment.

(Prevention of Clogging of Suction Nozzle)

When welding is performed for a long time using the suction nozzle 23, fumes are easily stacked if the surface roughness of the inner surface of the suction nozzle 23 is excessively large. When fumes are stacked, clogging occurs between the contact tip 25 and the suction nozzle, so that a gas cannot be sucked. For preventing such deposition of fumes, the surface roughness of the inner surface of the suction nozzle in the welding torch 100 (the same applies to 100A and 100B) is preferably small.

<Prevention of Generation of Pore Defects in Weld Metal>

(Securement of Shielding Property and Prevention of Sparking of Suction Nozzle)

In a welding method using the welding torch 100, a part of a shielding gas is sucked, and therefore the shielding property of the welded portion is deteriorated as compared to general gas shielding arc welding. When the shielding property is deteriorated, there arise problems of generation of pore defects in the weld metal, and so on. For preventing deterioration of the shielding property, the positions of the shield nozzle tip and the workpiece W are preferably close to each other. On the other hand, it is preferable that at the time of carrying out a welding procedure, the distance between the contact tip 25 and the workpiece W is adjusted to about 20 to 30 mm from the viewpoint of welding operability. When relative positional relation between the tip of the contact tip and the tip of the shielding gas supply nozzle (distance Lts along the welding wire longitudinal direction between the tip of the contact tip and the tip of the shielding gas supply nozzle) is set within a predetermined range in light of practical use, high shielding property can be secured in the welding torch 100.

In addition, when the suction nozzle 23 is made of a conductive material, and is not insulated from the tip body 29, the tip of the suction nozzle has a potential equal to that of the welding wire 13. Thus, when the suction nozzle 23 and the workpiece inadvertently come into contact with each other at the time of, for example, performing semiautomatic welding, sparking may occur between the suction nozzle and the workpiece, resulting in erosion of the suction nozzle 23. However, with the welding torch 100 having this configuration, erosion due to inadvertent sparking can be prevented because the shield nozzle is long, and the suction nozzle 23 is substantially covered.

(Securement of Shielding Property)

Further, when the outer diameter of the suction nozzle 23 and the inner diameter of the shielding gas supply nozzle 21 are small, the layer thickness of the gas which secures shielding property decreases, so that ingress of outside air into the inner part easily occurs. Exactly speaking, the flow velocity and the flow rate of the shielding gas may be related to securement of shielding property, and it has been confirmed that when the difference between the inner diameter Dsi of the shielding gas supply nozzle 21 and the outer diameter Dko of the suction nozzle 23 is set within a predetermined range under the supply of the shielding gas at an appropriate flow rate, shielding property is improved.

(Securement of Shielding Property and Prevention of Turbulent Flow)

It is preferable that the shielding gas is sent in a laminar flow state with little involvement of an ambient gas. However, when the outer diameter of the suction nozzle 23 is thick and/or the shielding gas supply nozzle 21 is thin, the shielding gas flow velocity at the outlet of the shielding gas supply nozzle 21 increases, so that the shielding gas is brought into a turbulent flow state even when the shielding gas is supplied at an appropriate flow rate. Here, air is excessively involved. For preventing such involvement of an ambient gas, the approximate value of the flow velocity at the gas outlet of the shielding gas supply nozzle 21 in the welding torch 100 is preferably low.

<Protection of Torch Components>

(Protection of Suction Nozzle) In securement of hydrogen suction performance as described above, the distance Ltk is preferably long, and on the other hand, the distance between the workpiece W and the suction nozzle 23 is preferably long for preventing the suction nozzle 23 from being damaged by spatters and/or radiant heat from the arc 41. For the distance between the contact tip 25 and the workpiece W, there is a proper range in view of welding operability. Thus, in the welding torch 100, it is necessary to decrease the distance Ltk for protecting the suction nozzle 23.

(Torch Durability and Protection of Insulating Resin)

In securement of shielding property and protection of sparking of suction nozzle as described above, the distance Lts is preferably long, and on the other hand, the distance between the workpiece W and the shielding gas supply nozzle 21 is long for preventing the shielding gas supply nozzle 21 from being overheated by radiant heat from the arc 41 to burn the insulating resin component 28 on the periphery of the tip body. For the distance between the contact tip 25 and the workpiece W, there is a proper range in view of welding operability. Thus, in the welding torch 100, it is necessary to decrease the distance Lts for protection of the suction nozzle 23.

(Durability of Suction Nozzle 23)

The suction nozzle 23 receives intense radiant heat from the arc 41. The suction nozzle 23 is normally cooled by a shielding gas flow, and therefore is not damaged, but when the thickness of the nozzle tip portion is small, the suction nozzle has a low heat capacity and poor heat conduction. Thus, the nozzle tip portion may be melted. For preventing erosion of the suction nozzle 23, it is necessary to increase the thickness (Dko−Dki) of the tip portion.

(Prevention of Sparking of Suction Nozzle 23)

When the suction nozzle 23 is composed of a conductive material, the suction nozzle 23 has a potential equal to the tip body 29 and/or the contact tip 25. Thus, when the workpiece W and the suction nozzle 23 are inadvertently brought into contact with each other, an arc 41 is generated from the suction nozzle 23, so that the suction nozzle 23 is immediately eroded. For preventing such erosion, it is preferable to increase the electric resistance between the tip body 29 and the tip of the suction nozzle. In addition, the welding wire 13 has a certain curve (cast) depending on the product form thereof. When the cast causes the welding wire 13 and the tip of the suction nozzle to come into contact with each other, an unstable branch current passes by way of the suction nozzle 23. The unstable branch current deteriorates welding operability, and reduces the amount of heat generated by the wire at a portion covered with the suction nozzle 23. In addition, the effect of reducing diffusible hydrogen may also be deteriorated because the discharge amount of the hydrogen source 11 decreases.

The electric resistance of the welding wire 13 which is a good conductor is very low. The electric resistance is about 20 mΩ at an interval of about 25 mm between the contact tip and the base material. Thus, for preventing generation of an arc from the suction nozzle 23 and/or passage of a large branch current through the suction nozzle due to contact between the welding wire 13 and the tip of the suction nozzle, the electric resistance between the tip body and the tip of the suction nozzle may be set to 50Ω or more. For designing the welding torch 100 with higher safety, it is preferable to set the electric resistance between the tip body and tip of the suction nozzle to 500Ω or more.

In the welding torch 100 with this configuration, the distance Lts along the welding wire longitudinal direction between the tip of the contact tip 25 and the tip of the shielding gas supply nozzle 21, and the distance Ltk along the welding wire longitudinal direction between the tip of the contact tip 25 and the tip of the suction nozzle 23 satisfy the relationship of:

$0 \leq Lts \leq 18$, and $7 \leq Ltk \leq 17$, and therefore, it is possible to secure hydrogen suction performance, protect the suction nozzle 23, secure shielding property and prevent sparking of the suction nozzle, and protect torch durability and the insulating resin.

In addition, in the welding torch 100, the tips of the shielding gas supply nozzle 21 and the suction nozzle 23 satisfy the relationship of:

$Dsi - Dko \geq 2$, $Dko - Dki \geq 1.2$, $8 \leq Dsi \leq 40$ and $1.5 \leq Dki \leq 12$, and therefore it is possible to secure shielding property and durability of the suction nozzle 23.

In addition, the welding torch 100 has an electric resistance of 50Ω or more between the tip body 29 and the tip of the suction nozzle 23, and therefore sparking of the suction nozzle 23 can be prevented.

In addition, in the welding torch 100, the surface roughness Ra of the nozzle inner peripheral surface of the suction nozzle 23 is 0.05 μm or more and 50 μm or less, and therefore fumes are hardly deposited or stacked on the nozzle inner peripheral surface, and thus clogging of the suction nozzle 23 in long-time use can be prevented.

In addition, where Qk is a suction gas flow rate at the suction nozzle 23, the welding torch 100 satisfies the relationship of:

$Ltk \geq 10 - 0.6 \times Qk$, and therefore hydrogen suction performance can be secured.

Further, where Ss is a cross-sectional area of a shielding gas outlet at the tip of the shielding gas supply nozzle 21, Qs is a shielding gas flow rate, and Vs is a flow velocity at the shielding gas outlet, the welding torch 100 satisfies the relationship of:

$Ss = (Dsi^2 - Dko^2)\pi/4$ $Vs = 1000 \times Qs/(60 \times Ss) \leq 7$, and therefore shielding property can be improved to prevent generation of a turbulent flow.

Next, other configuration examples of the welding torch will be described.

Figure 6:
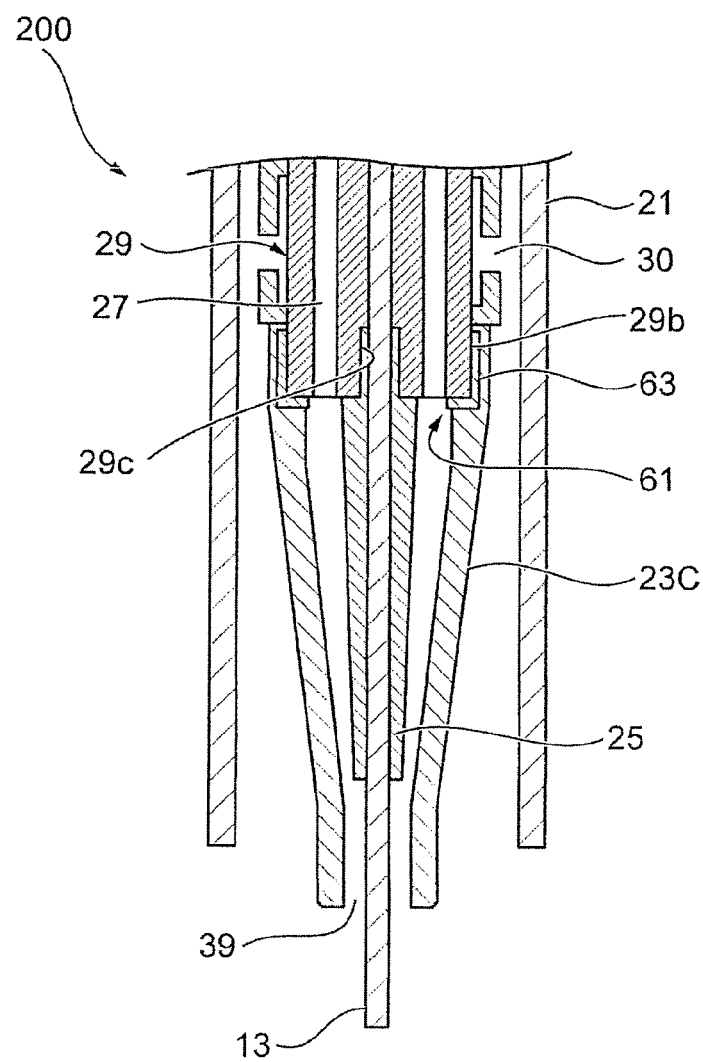
FIG. 6 is an enlarged view of a main part of a welding torch according to a second configuration example in which a suction nozzle has a heat-resistant insulating member at a joining portion with a tip body.

FIG. 6 is an enlarged view of a main part of a welding torch according to a second configuration example in which a suction nozzle 23C has a heat-resistant insulating member 63 at a joining portion 61 with the tip body 29.

In a welding torch 200 with this configuration, a heat-resistant insulating member 63 having a melting point of 400° C. or higher is disposed at the joining portion 61 between the tip body 29 supporting the contact tip 25 and the suction nozzle 23C. The temperature of a support portion of the suction nozzle 23C during welding has been confirmed to be elevated to about 350° C. as measured using a thermocouple, and thus an allowance is given to the heating resistance temperature by ensuring that the melting point of the heat-resistant insulating member 63 is 400° C. or higher.

The welding torch 200 has the heat-resistant insulating member 63 having a melting point of 400° C. or higher at the joining portion 61, and therefore sparking between the suction nozzle 23C and the workpiece can be prevented. In addition, deterioration of welding operability and the effect of reducing diffusible hydrogen due to contact between the welding wire and the suction nozzle during welding can be prevented.

Figure 7:
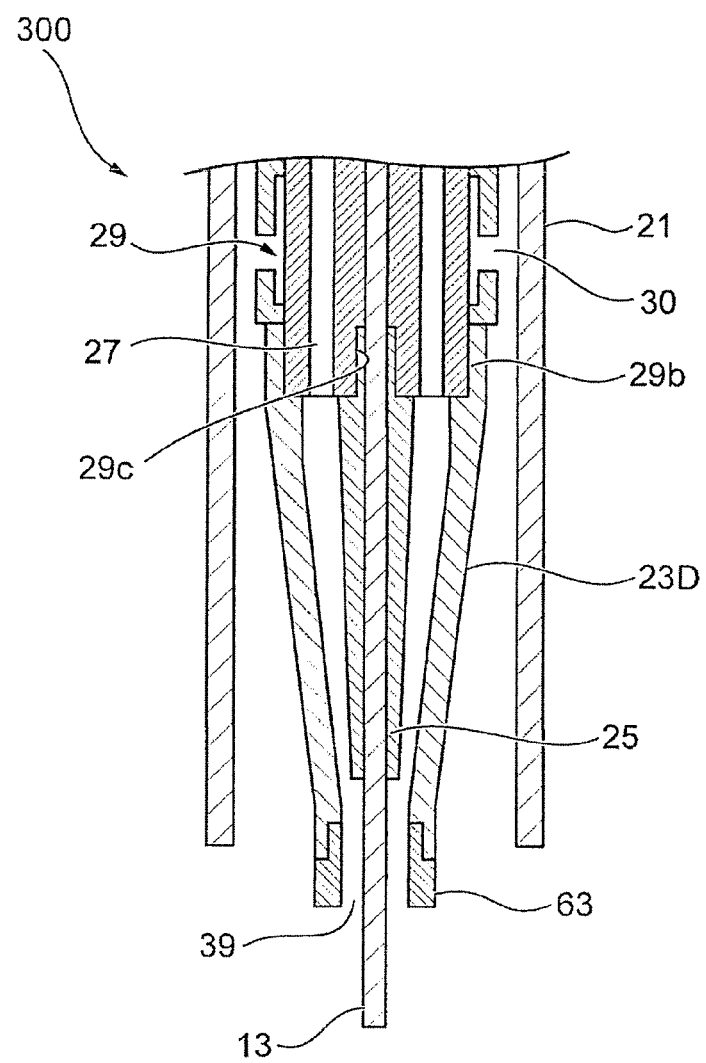
FIG. 7 is an enlarged view of a main part of a welding torch according to a third configuration example in which a suction nozzle has a heat-resistant insulating member at a tip portion of the suction nozzle.

FIG. 7 is an enlarged view of a main part of a welding torch according to a third configuration example in which the suction nozzle 23 has the heat-resistant insulating member 63 at a tip portion of a suction nozzle 23D.

In a welding torch 300 with this configuration, the suction nozzle 23D has the heat-resistant insulating member 63 having a melting point of 1700° C. or higher at the tip portion of the suction nozzle 23 on the welded portion side.

The welding torch 300 has the heat-resistant insulating member 63 having a melting point of 1700° C. or higher at the tip portion of the suction nozzle 23D, and therefore sparking between the suction nozzle 23D and the workpiece can be prevented. In addition, deterioration of welding operability and the effect of reducing diffusible hydrogen due to contact between the welding wire and the suction nozzle during welding can be prevented. Since molten spatters at about 1500° C. are deposited on the tip portion of the suction nozzle 23D, it is necessary to use a material having a melting point higher than that of the molten spatters for preventing damage to the nozzle. Thus, the melting point of the heat-resistant insulating member 63 is 1700° C. or higher.

Figure 8:
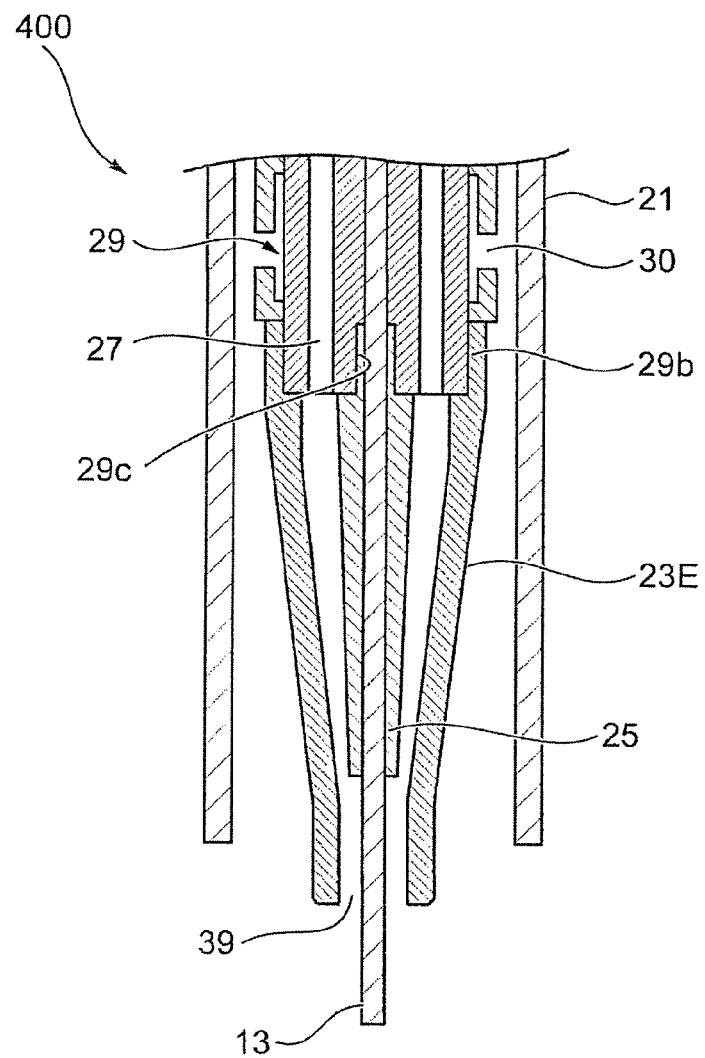
FIG. 8 is an enlarged view of a main part of a welding torch according to a fourth configuration example in which the whole of a suction nozzle is formed of a heat-resistant insulating material.

FIG. 8 is an enlarged view of a main part of a welding torch according to a fourth configuration example in which the whole of the suction nozzle 23 is formed of a heat-resistant insulating material.

In a welding torch 400 with this configuration, the whole nozzle of a suction nozzle 23E is formed of a heat-resistant insulating material having a melting point of 1700° C. or higher.

In the welding torch 400, the whole nozzle of the suction nozzle 23E is formed of a heat-resistant insulating material having a melting point of 1700° C. or more, and therefore sparking between the suction nozzle 23E and the workpiece can be prevented without complicating formation of the suction nozzle 23E. In addition, deterioration of welding operability and the effect of reducing diffusible hydrogen due to contact between the welding wire and the suction nozzle during welding can be prevented.

In addition, the welding torch 100 (the same applies to 100A, 100B, 200, 300, and 400) may have a configuration in which the suction nozzle 23 (hereinafter, the same applies to 23A, 23B, 23C, 23D, and 23E) and the shielding gas supply nozzle 21 having an oblong cross-section or an elliptical cross-section are concentrically disposed with the contact tip 25 at the center.

Further, the welding torch 100 may have a configuration in which the suction nozzle 23 and the shielding gas supply nozzle 21 having a tetragonal cross-section or a polygonal cross-section (e.g. a triangular, pentagonal, hexagonal or octagonal cross-section) are concentrically disposed with the contact tip 25 as the center.

As the material of the suction nozzle 23, various metals such as Cu, Cu alloys, and steel can be used. The suction nozzle 23 may be plated with Cr or the like. However, since the suction nozzle 23 is disposed at a position where it is influenced by radiant heat from the arc 41, low-melting-point metals such as Al and Mg are not preferable.

As a material having a high electric resistance, a ceramic can be used. Examples of the ceramic include alumina, silicon nitride, and zirconia.

Therefore, with the welding torch 100 according to this configuration example, welding quality can be improved by exhibiting high hydrogen suction performance while protecting the welding torch.

EXAMPLES

<Test Method>

A flux-containing wire A for 50 kgf-class steel was always used as a test welding wire. The diameter of the welding wire is φ1.2 mm.

(Amount of Diffusible Hydrogen)

Results obtained in accordance with "JIS Z 3118 (2007), Method for Measurement of Amount of Hydrogen in Steel Welded Portion" were determined from the equation shown in "JIS Z 3118 (2007), Article 7.2, Calculation of Amount of Hydrogen per Mass of Weld Metal," and an average value for three trials was employed as a result value.

Welding conditions are shown below. Welding was automatic welding using a moving cart.

Polarity: DCEP Welding current: 270 A
Arc voltage: 32V
Welding speed: 350 mm/min
Contact tip-base material distance: 25 mm
Welding position: downward When there was a sufficiently significant difference (difference of 3 mL/100 ml or more) in test result (experiment example 20 in Table 4) between the present welding torch and a nozzle-free torch for sucking hydrogen, it was determined that the present torch was effective (acceptable when the amount was 5.1 mL/100 ml or less).

(Pore Defects of Weld Metal)

Figure 9:
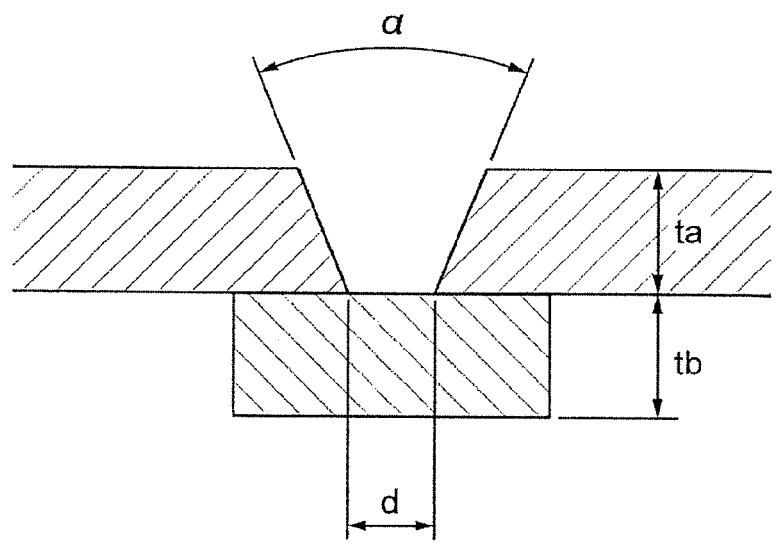
FIG. 9 is a sectional view of a test plate used in a test of pore defects.
Figure 10:
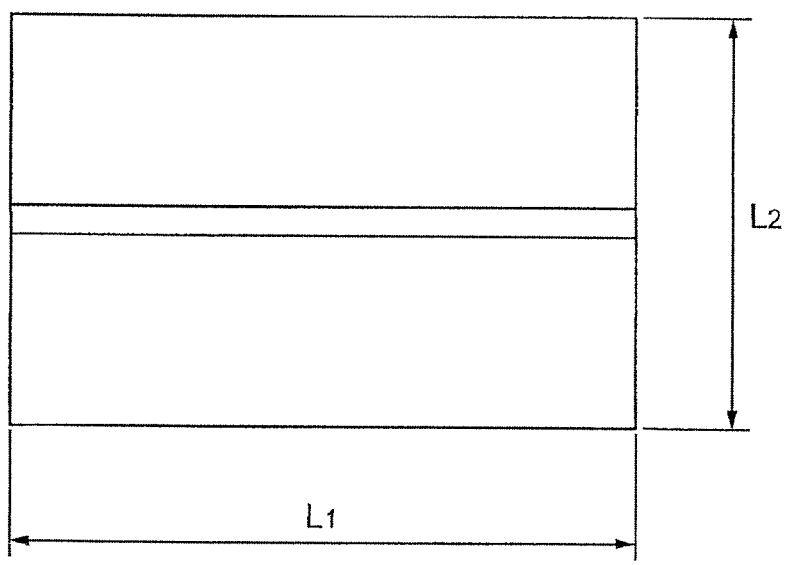
FIG. 10 is a plan view of the test plate shown in FIG. 9.
Figure 11:
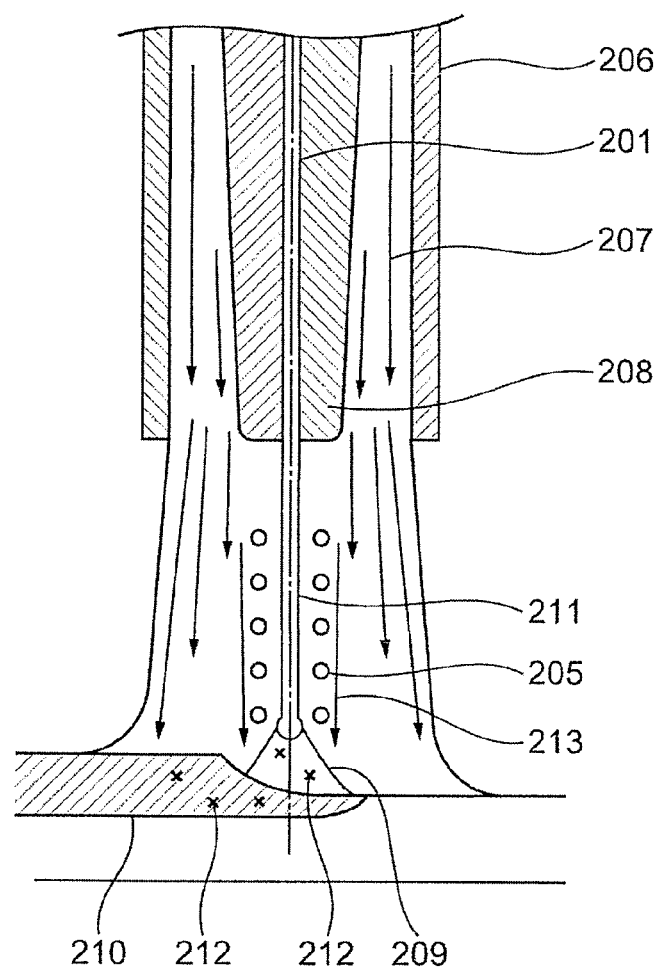
FIG. 11 is a diagram for illustrating a process in which diffusible hydrogen is absorbed by a weld metal.
Figure 12:
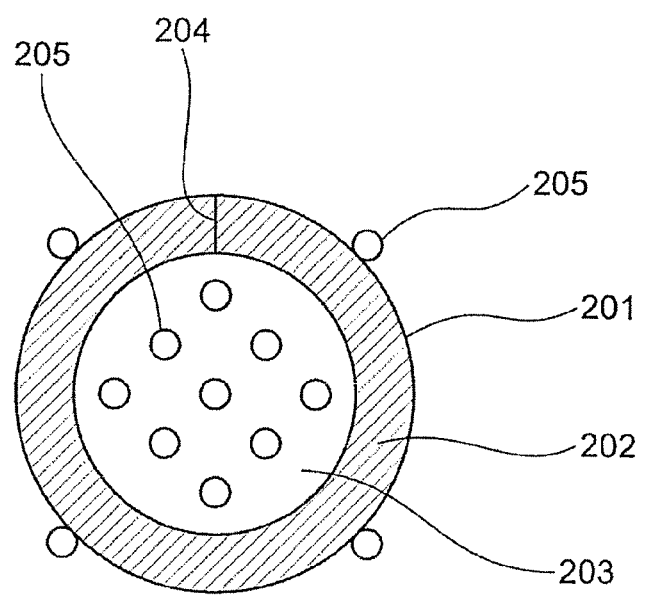
FIG. 12 is a view showing a cross-section of a flux cored wire.

For a test plate obtained by subjecting a base material with groove dimensions as shown in FIGS. 9 and 10 to one-pass welding, a radiograph was taken in accordance with "JIS Z 3104 (1995), Method for Radiation Transmission Test of Steel Welded Joint". Table 1 shows results of classifying the obtained radiograph in accordance with "JIS Z 3104 (1995), Annex 4, Method for Classification of Flaw Images in Radiography, and unique criteria. In this test, flaws of type 2, type 3, and type 4 were not found, and only flaws of type 1 were found.

Welding conditions are shown below. Welding was semi-automatic welding.

Polarity: DCEP Welding current: 270 A
Arc voltage: 32V
Welding speed: 270-300 mm/min
Contact tip-base material distance: 25 mm
Welding position: downward
Material of base material: SM 490A (rolled steel material for welded structure JIS G 3106) Dimensions of base material: Length L1=200 mm, width L2=150 mm, thickness ta=6 mm
Groove angle α=45°
Base material distance d=4 mm
Backing metal: thickness tb=6 mm

TABLE 1

| Grades | Classification based on JIS Z 3104 (1995), Annex 4 | Criteria |
|---|---|---|
| A | Type 1, class 1 | No defects |
| B | Type 1, class 1 | Only flaws which have a flaw major diameter of 0.5 mm or less and which are not counted as flaws are found |
| C | Type 1, class 1 | The flaw count is 1 |
| D | Type 1, class 2 | (The flaw count is 2 or 3) |
| E | Type 1, class 3 or 4 | (The flaw count is 4 or more) |

In the table, grades A to D are passing grades, and grade E is a non-passing grade.

(Continuous Welding Test)

Continuous welding was performed for 10 minutes to examine the durability of the torch and the nozzle. After completion of the welding, each component was observed and evaluated for damage. In evaluation of the suction nozzle and the shielding gas supply nozzle, deposited spatters were removed, and these nozzles were evaluated from the deposition thickness and the surface condition after the removal. Evaluation criteria are shown in Table 2.

The suction nozzle was evaluated in five grades: A to E, and the shielding gas supply nozzle and the insulating resin component were evaluated in three grades: A, C, and E. Of the grades of thereof, one closest to E was set to an overall grade in this test.

TABLE 2

| Grades | Classification based on JIS Z 3104 (1995), Annex 4 | Criteria |
|---|---|---|
| A | Type 1, class 1 | No defects |
| B | Type 1, class 1 | Only flaws which have a flaw major diameter of 0.5 mm or less and which are not counted as flaws are found |
| C | Type 1, class 1 | The flaw count is 1 |
| D | Type 1, class 2 | (The flaw count is 2 or 3) |
| E | Type 1, class 3 or 4 | (The flaw count is 4 or more) |

In the table, grades A to D are passing grades, and grade E is a non-passing grade.

(Influences of Gas)

Gas density [kg/m$^3$] (0° C. 1 *atm*[101 kPa])

TABLE 3

| $H_2$ | $CO_2$ | Ar | He |
|---|---|---|---|
| 0.0899 | 1.977 | 1.783 | 0.1786 |

Preparation Example of Torch Structure

TABLE 4

| No. | Lts | Ltk | Dsi | Dki | Dko | Dsi − Dko | Dko − Dki | Suction flow rate Qk [l/min] | 10 − 0.6 × Qk | 10 − 0.4 × Qk | Gas flow rate Qs [l/min] | Cross-sectional area of shielding gas outlet [mm²] | Flow rate Vs at shielding gas port [m/s] | Roughness of inner surface of suction nozzle [μm] | Shielding gas | Diffusible hydrogen test result | Pore defects of weld metal | Continuous welding test |
|---|---|---|---|---|---|---|---|---|---|---|---|---|---|---|---|---|---|---|
| Experiment Example 1 | 10 | 7 | 13 | 4 | 6 | 7 | 2 | 8 | 5.2 | 6.8 | 25 | 104 | 4.0 | Lathe machining: About 2 μm | CO₂ | 3.3 | A | A |
| Experiment Example 2 | 10 | 9 | 13 | 4 | 6 | 7 | 2 | 8 | 5.2 | 6.8 | 25 | 104 | 4.0 | Lathe machining: About 2 μm | CO₂ | 2.8 | A | B |
| Experiment Example 3 | 10 | 12 | 16 | 4 | 8 | 8 | 4 | 8 | 5.2 | 6.8 | 25 | 151 | 2.8 | Lathe machining: About 2 μm | CO₂ | 2.3 | A | A |
| Experiment Example 4 | 10 | 14 | 16 | 4 | 8 | 8 | 4 | 8 | 5.2 | 6.8 | 25 | 151 | 2.8 | Lathe machining: About 2 μm | CO₂ | 2.6 | A | A |
| Experiment Example 5 | 10 | 15 | 16 | 4 | 8 | 8 | 4 | 8 | 5.2 | 6.8 | 25 | 151 | 2.8 | Lathe machining: About 2 μm | CO₂ | 2.5 | A | C |
| Experiment Example 6 | 10 | 17 | 16 | 4 | 8 | 8 | 4 | 8 | 5.2 | 6.8 | 25 | 151 | 2.8 | Lathe machining: About 2 μm | CO₂ | 2.7 | A | D |
| Experiment Example 7 | 0 | 9 | 19 | 5 | 8 | 11 | 3 | 8 | 5.2 | 6.8 | 25 | 233 | 1.8 | Lathe machining: About 2 μm | CO₂ | 3.1 | D | A |
| Experiment Example 8 | 4 | 9 | 19 | 5 | 8 | 11 | 3 | 8 | 5.2 | 6.8 | 25 | 233 | 1.8 | Lathe machining: About 2 μm | CO₂ | 3.1 | A | A |
| Experiment Example 9 | 15 | 9 | 19 | 5 | 8 | 11 | 3 | 8 | 5.2 | 6.8 | 25 | 233 | 1.8 | Lathe machining: About 2 μm | CO₂ | 2.8 | A | A |
| Experiment Example 10 | 16 | 9 | 19 | 5 | 8 | 11 | 3 | 8 | 5.2 | 6.8 | 25 | 233 | 1.8 | Lathe machining: About 2 μm | CO₂ | 3.0 | A | A |
| Experiment Example 11 | 18 | 9 | 19 | 5 | 8 | 11 | 3 | 8 | 5.2 | 6.8 | 25 | 233 | 1.8 | Lathe machining: About 2 μm | CO₂ | 3.2 | A | D |
| Experiment Example 12 | 10 | 9 | 16 | 5 | 14 | 2 | 9 | 8 | 5.2 | 6.8 | 15 | 47 | 5.3 | Lathe machining: About 2 μm | CO₂ | 2.9 | D | A |
| Experiment Example 13 | 10 | 9 | 16 | 5 | 13 | 3 | 8 | 8 | 5.2 | 6.8 | 15 | 68 | 3.7 | Lathe machining: About 2 μm | CO₂ | 3.0 | C | A |
| Experiment Example 14 | 10 | 9 | 16 | 5 | 11 | 5 | 6 | 8 | 5.2 | 6.8 | 20 | 106 | 3.1 | Lathe machining: About 2 μm | CO₂ | 3.1 | B | A |
| Experiment Example 15 | 10 | 9 | 16 | 1.8 | 3 | 13 | 1.2 | 8 | 5.2 | 6.8 | 25 | 194 | 2.1 | Lathe machining: About 2 μm | CO₂ | 2.4 | A | C |

TABLE 4-continued

| No. | Lts | Ltk | Dsi | Dki | Dko | Dsi − Dko | Dko − Dki | Suction flow rate Qk [l/min] | 10 − 0.6 × Qk | 10 − 0.4 × Qk | Gas flow rate Qs [l/min] | Cross-sectional area of shielding gas outlet [mm²] | Flow rate Vs at shielding gas port [m/s] | Roughness of inner surface of suction nozzle [μm] | Shielding gas | Diffusible hydrogen test result | Pore defects of weld metal | Continuous welding test |
|---|---|---|---|---|---|---|---|---|---|---|---|---|---|---|---|---|---|---|
| Experiment Example 16 | −3 | 9 | 16 | 5 | 10 | 6 | 5 | 8 | 5.2 | 6.8 | 25 | 123 | 3.4 | Lathe machining: About 2 μm | CO₂ | 3.1 | E | A |
| Experiment Example 17 | 20 | 9 | 16 | 5 | 10 | 6 | 5 | 8 | 5.2 | 6.8 | 25 | 123 | 3.4 | Lathe machining: About 2 μm | CO₂ | 2.9 | A | E |
| Experiment Example 18 | 10 | 5 | 16 | 5 | 10 | 6 | 5 | 8 | 5.2 | 6.8 | 25 | 123 | 3.4 | Lathe machining: About 2 μm | CO₂ | 7.0 | A | A |
| Experiment Example 19 | 10 | 20 | 16 | 5 | 10 | 6 | 5 | 8 | 5.2 | 6.8 | 25 | 123 | 3.4 | Lathe machining: About 2 μm | CO₂ | 2.6 | A | E |
| Experiment Example 20 | 0 | — | 16 | — | — | — | — | — | — | — | 25 | 200 | 2.1 | — | CO₂ | 8.1 | A | A |
| Experiment Example 21 | 10 | 9 | 8 | 2 | 5 | 3 | 3 | 8 | 5.2 | 6.8 | 25 | 31 | 13.6 | Lathe machining: About 2 μm | CO₂ | 2.6 | B | A |
| Experiment Example 22 | 10 | 9 | 35 | 5 | 8 | 27 | 3 | 8 | 5.2 | 6.8 | 25 | 912 | 0.5 | Lathe machining: About 2 μm | CO₂ | 3.0 | A | A |
| Experiment Example 23 | 10 | 9 | 40 | 5 | 8 | 32 | 3 | 8 | 5.2 | 6.8 | 25 | 1206 | 0.3 | Lathe machining: About 2 μm | CO₂ | 3.2 | A | C |
| Experiment Example 24 | 10 | 9 | 16 | 1.5 | 8 | 8 | 6.5 | 8 | 5.2 | 6.8 | 25 | 151 | 2.8 | Lathe machining: About 2 μm | CO₂ | 2.5 | A | A |
| Experiment Example 25 | 10 | 9 | 16 | 5 | 14.5 | 1.5 | 9.5 | 8 | 5.2 | 6.8 | 15 | 36 | 7.0 | Lathe machining: About 2 μm | CO₂ | 3.2 | D | A |
| Experiment Example 26 | 10 | 9 | 16 | 5 | 6 | 10 | 1 | 8 | 5.2 | 6.8 | 25 | 173 | 2.4 | Lathe machining: About 2 μm | CO₂ | 3.1 | A | C |

Experiment Examples 1 to 26

Experiment Example 6 in which the distance Ltk between the tip of the contact tip and the tip of the suction nozzle was 17 mm had low continuous weldability. However, this is because a large amount of spatters were deposited at the tip of the suction nozzle after continuous welding was performed for 10 minutes, and it was determined that further continuation of welding would clog the nozzle. Experiment Example 19 in which the distance Ltk was longer had a non-passing grade for continuous weldability. Experiment Example 1 in which the distance Ltk was 7 mm had good results for pore defects and the continuous welding test, but Experiment Example 18 in which the distance Ltk was shorter had a relatively high value as a diffusible hydrogen test result.

Experiment Example 7 in which the distance Lts between the tip of the contact tip and the tip of the shielding gas supply nozzle was 0 mm had a low grade for pore defects. This result, when combined with the result of Experiment Example 16 in which the distance Lts is −3 mm, shows that in welding with the present torch in which a part of the shielding gas is sucked from the suction nozzle, the shielding gas flow is easily disordered, and the limit of the distance Lts is Lts=0 at which grade D is given as a test result for pore defects.

Experiment Example 11 in which the distance Lts was 18 mm had low continuous weldability. In Experiment Example 11, a large amount of spatters are deposited at the tip of the shielding gas supply nozzle just after performing the continuous welding, and the deposited spatters glowed. When the spatters were removed, there was no noticeable damage, but it was determined that further continuation of welding would damage the insulating member connecting the nozzle. Experiment Example 17 in which the distance Lts was longer had a non-passing grade in continuous weldability test.

Experiment Example 12 in which the gap between the inner diameter Dsi of the shielding gas supply nozzle and the outer diameter Dko of the suction nozzle was small had a low grade for pore defects. It was determined that since the shielding gas flow had a small layer thickness of 2 mm, a slight amount of a nitrogen component was mixed in the arc atmosphere due to diffusion from the air. Further, Experiment Example 25 in which the gap between Dsi and Dko was as small as 1.5 mm had a low grade for pore defects.

Experiment Examples with Changed Flow Rate

TABLE 5

| No. | Lts | Ltk | Dsi | Dki | Dko | Dsi − Dko | Dko − Dki | Suction flow rate $Q_k$ [l/min] | $10 − 0.6 \times Q_k$ | $10 − 0.4 \times Q_k$ | Gas flow rate $Q_s$ [l/min] | Cross-sectional area of shielding gas outlet [mm$^2$] |
|---|---|---|---|---|---|---|---|---|---|---|---|---|
| Experiment Example 27 | 10 | 7 | 16 | 4 | 6 | 10 | 2 | 6 | 6.4 | 7.6 | 25 | 173 |
| Experiment Example 28 | 10 | 7 | 16 | 4 | 6 | 10 | 2 | 5 | 7 | 8 | 25 | 173 |
| Experiment Example 29 | 10 | 7 | 16 | 4 | 6 | 10 | 2 | 4 | 7.6 | 8.4 | 25 | 173 |
| Experiment Example 30 | 10 | 9 | 16 | 4 | 6 | 10 | 2 | 4 | 7.6 | 8.4 | 25 | 173 |
| Experiment Example 31 | 10 | 9 | 16 | 4 | 6 | 10 | 2 | 3 | 8.2 | 8.8 | 25 | 173 |
| Experiment Example 32 | 10 | 9 | 16 | 4 | 6 | 10 | 2 | 2 | 8.8 | 9.2 | 25 | 173 |
| Experiment Example 33 | 10 | 9 | 16 | 5 | 13 | 3 | 8 | 8 | 5.2 | 6.8 | 18 | 68 |
| Experiment Example 34 | 10 | 9 | 19 | 8 | 16 | 3 | 8 | 8 | 5.2 | 6.8 | 30 | 82 |
| Experiment Example 35 | 10 | 9 | 23 | 12 | 20 | 3 | 8 | 8 | 5.2 | 6.8 | 30 | 101 |

| No. | Flow velocity Vs at shielding gas outlet [m/s] | Roughness of inner surface of suction nozzle [μm] | Shielding gas | Diffusible hydrogen test result | Pore defects of weld metal | Continuous welding test |
|---|---|---|---|---|---|---|
| Experiment Example 27 | 2.4 | Lathe machining: About 2 μm | $CO_2$ | 3.6 | A | A |
| Experiment Example 28 | 2.4 | Lathe machining: About 2 μm | $CO_2$ | 4.1 | A | A |
| Experiment Example 29 | 2.4 | Lathe machining: About 2 μm | $CO_2$ | 4.9 | A | A |
| Experiment Example 30 | 2.4 | Lathe machining: About 2 μm | $CO_2$ | 2.9 | A | B |
| Experiment Example 31 | 2.4 | Lathe machining: About 2 μm | $CO_2$ | 3.0 | A | B |
| Experiment Example 32 | 2.4 | Lathe machining: About 2 μm | $CO_2$ | 3.9 | A | B |
| Experiment Example 33 | 4.4 | Lathe machining: About 2 μm | $CO_2$ | 3.2 | C | A |
| Experiment Example 34 | 6.1 | Lathe machining: About 2 μm | $CO_2$ | 2.9 | C | A |

TABLE 5-continued

|  |  |  |  |  |  |  |
|---|---|---|---|---|---|---|
| Experiment Example 35 | 4.9 | Lathe machining: About 2 μm | $CO_2$ | 3.2 | C | A |

Experiment Examples 27 to 35

Among Experiment Examples in which the flow rate was changed, Experiment Examples 34 and 35 in which the flow velocity Vs at the shielding gas outlet was high had a low grade for pore defects. This flow rate is a value determined with a float-type flowmeter disposed in the middle of the suction shielding gas channel 17.

<Insulation Method and Nozzle Inner Surface Roughness Examination Examples>

TABLE 6

| No. | Lts | Ltk | Dsi | Dki | Dko | Dsi – Dko | Dko – Dki | Suction flow rate Qk [l/min] | 10 – 0.6 × Qk | 10 – 0.4 × Qk | Gas flow rate Qs [l/min] | Cross-sectional area of shielding gas outlet [mm²] |
|---|---|---|---|---|---|---|---|---|---|---|---|---|
| Experiment Example 36 | 10 | 7 | 13 | 4 | 6 | 7 | 2 | 8 | 5.2 | 6.8 | 25 | 104 |
| Experiment Example 37 | 10 | 7 | 13 | 4 | 6 | 7 | 2 | 8 | 5.2 | 6.8 | 25 | 104 |
| Experiment Example 38 | 10 | 7 | 13 | 4 | 6 | 7 | 2 | 8 | 5.2 | 6.8 | 25 | 104 |
| Experiment Example 39 | 10 | 7 | 13 | 4 | 6 | 7 | 2 | 8 | 5.2 | 6.8 | 25 | 104 |
| Experiment Example 40 | 10 | 7 | 13 | 4 | 6 | 7 | 2 | 8 | 5.2 | 6.8 | 25 | 104 |

| No. | Flow velocity Vs at shielding gas outlet [m/s] | Roughness of inner surface of suction nozzle [μm] | Shielding gas | Diffusible hydrogen test result | Pore defects of weld metal | Continuous welding test |
|---|---|---|---|---|---|---|
| Experiment Example 36 | 4.0 | Lapping polish: 0.13 μm | $CO_2$ | 3.5 | A | A |
| Experiment Example 37 | 4.0 | Lathe machining: 2 μm | $CO_2$ | 3.4 | A | A |
| Experiment Example 38 | 4.0 | Drawing: 4 μm | $CO_2$ | 3.6 | A | A |
| Experiment Example 39 | 4.0 | Forging: 15 μm | $CO_2$ | 3.5 | A | A |
| Experiment Example 40 | 4.0 | Mold casting: 70 μm | $CO_2$ | 3.4 | A | A |

Experiment Examples 36 to 40

In insulation method and nozzle inner surface roughness examination examples, the suction nozzle was detached to examine the inner peripheral surface after the continuous welding test, and the result showed that fumes were not unacceptably stacked as long as the surface roughness Ra of the nozzle inner peripheral surface of the suction nozzle was 0.13 μm or more and 70 μm or less. Among these examples, Experiment Example 40 had a slightly large amount of stacked fumes. In Experiment Example 40, it was apprehended that further continuation of welding would cause clogging between the suction nozzle and the contact tip due to stacking of fumes, making it impossible to perform suction. There is no significant difference in the amount of stacked fumes between Experiment Example 36 in which the lapping polish finishing was performed and Example 37 in which only lathe machining was performed, and from the viewpoint of processing cost, it is preferable that only lathe machining is performed.

<Others (Influences of Shielding Gas)>

TABLE 7

| No. | Lts | Ltk | Dsi | Dki | Dko | Dsi – Dko | Dko – Dki | Suction flow rate Qk [l/min] | 10 – 0.6 × Qk | 10 – 0.4 × Qk | Gas flow rate Qs [l/min] | Cross-sectional area of shielding gas outlet [mm²] |
|---|---|---|---|---|---|---|---|---|---|---|---|---|
| Experiment Example 41 | 10 | 9 | 13 | 4 | 6 | 7 | 2 | 8 | 5.2 | 6.8 | 25 | 104 |

TABLE 7-continued

| | | | | | | | | | | | |
|---|---|---|---|---|---|---|---|---|---|---|---|
| Experiment Example 42 | 10 | 9 | 13 | 4 | 6 | 7 | 2 | 8 | 5.2 | 6.8 | 25 | 104 |
| Experiment Example 43 | 10 | 9 | 13 | 4 | 6 | 7 | 2 | 8 | 5.2 | 6.8 | 25 | 104 |
| Experiment Example 44 | 10 | 9 | 13 | 4 | 6 | 7 | 2 | 8 | 5.2 | 6.8 | 25 | 104 |

| No. | Flow velocity Vs at shielding gas outlet [m/s] | Roughness of inner surface of suction nozzle [μm] | Shielding gas | Diffusible hydrogen test result | Pore defects of weld metal | Continuous welding test |
|---|---|---|---|---|---|---|
| Experiment Example 41 | 4.0 | Lathe machining: About 2 μm | $CO_2$ | 2.8 | A | B |
| Experiment Example 42 | 4.0 | Lathe machining: About 2 μm | Ar + 20% $CO_2$ | 3.0 | A | B |
| Experiment Example 43 | 4.0 | Lathe machining: About 2 μm | Ar | 3.1 | A | B |
| Experiment Example 44 | 4.0 | Lathe machining: About 2 μm | He | 4.5 | A | B |

Experiment Examples 41 to 44

For the effect of the shielding gas, hydrogen has a low density (light particles), and is therefore efficiently discharged when the shielding gas is a gas having a high density. When the shielding gas is a gas having a low density, such as He, the discharge amount of hydrogen tends to relatively decrease.

Thus, the present disclosure is not limited to the above-described embodiments, and combinations of the configurations of the embodiments, and changes and applications made on the basis of the description of this specification and well known techniques by those skilled in the art are also intended by the present disclosure, and included in the scope to be protected.

Thus, the following matters are herein disclosed.

(1) Disclosed is a welding torch which performs arc welding in a shielding gas atmosphere, the welding torch comprising: a contact tip that supports a welding wire which is supplied with a welding current while the welding wire can be fed toward a tip portion; a suction nozzle that surrounds a periphery of the welding wire protruded from a tip portion of the contact tip, and sucks a gas from a space formed between the suction nozzle and the welding wire; and a shielding gas supply nozzle that is provided on an outer periphery of the suction nozzle, and supplies the shielding gas toward a welded portion at a tip of the welding wire from a space formed between the shielding gas supply nozzle and the suction nozzle, wherein the welding torch satisfies the relationship of $7 \leq Ltk \leq 17$ and $0 \leq Lts \leq 18$, where Lts [mm] is a distance along a welding wire longitudinal direction between a tip of the contact tip and a tip of the shielding gas supply nozzle, and Ltk [mm] is a distance along the welding wire longitudinal direction between the tip of the contact tip and a tip of the suction nozzle.

With this welding torch, the suction nozzle can be protected while hydrogen suction performance is secured. In addition, shielding property is secured to prevent sparking between the suction nozzle and the workpiece, so that the torch can be prevented from being damaged by heat.

(2) Disclosed is the welding torch according to (1), wherein the tips of the shielding gas supply nozzle and the suction nozzle satisfy the relationship of Dsi−Dko≥2, Dko−Dki≥1.2, $8 \leq Dsi \leq 40$ and $1.5 \leq Dki \leq 12$ where Dsi [mm] is an inner diameter of the shielding gas supply nozzle, Dki [mm] is an inner diameter of the suction nozzle, and Dko [mm] is an outer diameter of the suction nozzle. However, when a plurality of the suction nozzles are mounted, the largest of the distances along the welding wire longitudinal direction between the tip of the contact tip and the tips of the suction nozzles is defined as the distance Ltk.

With this welding torch, shielding property is improved, so that the durability of the suction nozzle can be improved.

(3) Disclosed is the welding torch according to (1) or (2), wherein an electric resistance between a tip body and the tip of the suction nozzle is 50Ω or more.

With this welding torch, sparking between the suction nozzle and the workpiece can be more reliably prevented, and deterioration of welding operability and the effect of reducing diffusible hydrogen due to contact between the welding wire and the suction nozzle during welding can be prevented.

(4) Disclosed is the welding torch according to (3), wherein the suction nozzle has a heat-resistant insulating member having a melting point of 1700° C. or higher at a tip portion of the suction nozzle on the welded portion side.

With this welding torch, sparking between the suction nozzle and the workpiece can be more reliably prevented, and deterioration of welding operability and the effect of reducing diffusible hydrogen due to contact between the welding wire and the suction nozzle during welding can be prevented.

(5) Disclosed is the welding torch according to (3) or (4), wherein the suction nozzle has a heat-resistant insulating member having a melting point of 400° C. or higher at a joining portion with the tip body supporting the contact tip.

With this welding torch, sparking between the suction nozzle and the workpiece can be more reliably prevented, and deterioration of welding operability and the effect of reducing diffusible hydrogen due to contact between the welding wire and the suction nozzle during welding can be prevented.

(6) Disclosed is the welding torch according to (3), wherein a whole nozzle of the suction nozzle is formed of a heat-resistant insulating material having a melting point of 1700° C. or higher.

With this welding torch, sparking between the suction nozzle and the workpiece can be more reliably prevented without complicating formation of the suction nozzle, and deterioration of welding operability and the effect of reducing diffusible hydrogen due to contact between the welding wire and the suction nozzle during welding can be prevented.

(7) The welding torch according to any one of (1) to (6), wherein a nozzle inner peripheral surface of the suction nozzle has a surface roughness Ra of 0.05 μm or more and 50 μm or less.

With this welding torch, clogging of the suction nozzle by stacking of fumes on the inner peripheral surface can be prevented.

(8) Disclosed is the welding torch according to (1) or (2), wherein the welding torch satisfies the relationship of Ltk 10−0.6×Qk where Qk [L/min] is a suction gas flow rate at the suction nozzle.

With this welding torch, hydrogen suction performance can be improved.

(9) Disclosed is the welding torch according to (1), wherein the welding torch satisfies the relationship of $Ss=(Dsi^2-Dko^2)\pi/4$ and $Vs=1000\times Qs/(60\times Ss)\leq 7$ where Ss [mm$^2$] is a cross-sectional area of a shielding gas outlet at the tip of the shielding gas supply nozzle, Qs [L/min] is a shielding gas flow rate, and Vs [m/s] is a flow velocity at the shielding gas outlet.

With this welding torch, a turbulent flow can be prevented to improve shielding property.

The invention claimed is:

1. A welding torch which performs arc welding in a shielding gas atmosphere, the welding torch comprising:
   a contact tip that supports a welding wire which is supplied with a welding current while the welding wire is fed in a welding wire longitudinal direction toward a tip portion of the contact tip;
   a suction nozzle that surrounds a periphery of the welding wire protruded from the tip portion of the contact tip, and sucks a gas from a space formed between the suction nozzle and the welding wire; and
   a shielding gas supply nozzle that is provided on an outer periphery of the suction nozzle, and supplies the shielding gas toward a welded portion at a tip of the welding wire from a space formed between the shielding gas supply nozzle and the suction nozzle, wherein
   where a value of Lts [mm] is a positive distance along a direction of feeding the welding wire in the welding wire longitudinal direction, from the tip portion of the contact tip to a tip portion of the shielding gas supply nozzle, and Ltk [mm] is a positive distance along the direction of feeding the welding wire in the welding wire longitudinal direction from the tip portion of the contact tip to a tip portion of the suction nozzle, wherein the welding torch satisfies the relationship of the formula (1)

$7 \leq Ltk \leq 17$, $0 \leq Lts \leq 18$         (1), whereby hydrogen discharged from the welding wire that has exited the contact tip is sucked by the suction nozzle and the suction nozzle is not melted by arc heat.

2. The welding torch according to claim 1, wherein where Dsi [mm] is an inner diameter of the shielding gas supply nozzle, Dki [mm] is an inner diameter of the suction nozzle, and Dko [mm] is an outer diameter of the suction nozzle, the tip portions of the shielding gas supply nozzle and the suction nozzle satisfy the relationship of the formula (2)

$Dsi-Dko \geq 2$, $Dko-Dki \geq 1.2$, $8 \leq Dsi \leq 40$, $1.5 \leq Dki \leq 12$         (2).

3. The welding torch according to claim 1, wherein the suction nozzle is supported by a tip body, and wherein an electric resistance between the tip body and the tip portion of the suction nozzle is 50Ω or more.

4. The welding torch according to claim 3, wherein the suction nozzle has a heat-resistant insulating member having a melting point of 1700° C. or higher at the tip portion of the suction nozzle.

5. The welding torch according to claim 3, wherein the suction nozzle has a heat-resistant insulating member having a melting point of 400° C. or higher at a joining portion with the tip body supporting the contact tip.

6. The welding torch according to claim 3, wherein an entirety of the suction nozzle is formed of a heat-resistant insulating material having a melting point of 1700° C. or higher.

7. The welding torch according to claim 1, wherein a nozzle inner peripheral surface of the suction nozzle has a surface roughness Ra of 0.05 μm or more and 50 μM or less.

8. The welding torch according to claim 1, wherein where Ss [mm$^2$] is a cross-sectional area of a shielding gas outlet at the tip of the shielding gas supply nozzle, Qs [L/min] is a shielding gas flow rate, and Vs [m/s] is a flow velocity at the shielding gas outlet, the welding torch satisfies the relationship of the formula (4)

$Vs \leq 7$         (4).

9. The welding torch according to claim 2, wherein the suction nozzle is supported by a tip body, and wherein an electric resistance between the tip body and the tip portion of the suction nozzle is 50Ω or more.

10. The welding torch according to claim 9, wherein the suction nozzle has a heat-resistant insulating member having a melting point of 1700° C. or higher at the tip portion of the suction nozzle.

11. The welding torch according to claim 9, wherein the suction nozzle has a heat-resistant insulating member having a melting point of 400° C. or higher at a joining portion with the tip body supporting the contact tip.

12. The welding torch according to claim 9, wherein an entirety of the suction nozzle is formed of a heat-resistant insulating material having a melting point of 1700° C. or higher.

13. The welding torch according to claim 2, wherein a nozzle inner peripheral surface of the suction nozzle has a surface roughness Ra of 0.05 μm or more and 50 μm or less.

* * * * *